(12) United States Patent
Kishida et al.

(10) Patent No.: US 9,838,589 B2
(45) Date of Patent: Dec. 5, 2017

(54) IMAGING APPARATUS INCLUDING ZOOM MECHANISM, AND INTERCHANGEABLE LENS

(71) Applicant: Panasonic Intellectual Property Management Co., Ltd., Osaka (JP)

(72) Inventors: Naotaka Kishida, Osaka (JP); Yasuhiro Shingu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/299,832

(22) Filed: Oct. 21, 2016

(65) Prior Publication Data
US 2017/0237893 A1    Aug. 17, 2017

(30) Foreign Application Priority Data

Feb. 15, 2016    (JP) .................................. 2016-026248

(51) Int. Cl.
*H04N 5/232*    (2006.01)
*H04N 5/225*    (2006.01)
(Continued)

(52) U.S. Cl.
CPC ......... *H04N 5/23209* (2013.01); *G02B 7/102* (2013.01); *G02B 7/14* (2013.01);
(Continued)

(58) Field of Classification Search
CPC ............. H04N 5/23209; H04N 5/2254; H04N 5/23296; H04N 5/3765; H04N 5/23212; H04N 5/23245; G02B 7/102; G02B 7/14; G02B 7/282; G02B 7/09–7/10; G03B 17/14; G03B 13/34; G03B 13/36; G03B 2205/0046
See application file for complete search history.

(56) References Cited

U.S. PATENT DOCUMENTS 6,184,932 B1    2/2001    Tanaka
8,135,268 B2 *  3/2012    Hongu .................. G02B 7/102
                                          396/80

(Continued)

FOREIGN PATENT DOCUMENTS

| JP | 62-284318 | 12/1987 |
|----|-----------|---------|
| JP | 8-265619  | 10/1996 |
| JP | 8-286096  | 11/1996 |

*Primary Examiner* — Michael Osinski
(74) *Attorney, Agent, or Firm* — Wenderoth, Lind & Ponack, L.L.P.

(57) ABSTRACT

An imaging apparatus including an exchangeable lens and a camera body. The camera body transmits a synchronizing signal having the same cycle as the cycle of the capturing operation in the imaging unit, to the interchangeable lens. The controller of the exchangeable lens performs a zoom tracking control by determining the focus position of the focus lens from the position of the zoom lens detected by the position detector by referring to the relation information, and controlling the focus lens driver to move the focus lens to the determined focus position, The controller performs the zoom tracking control in a cycle (for example, one-eighth) shorter than a cycle indicated by the synchronizing signal received from the camera body.

9 Claims, 12 Drawing Sheets

(51) Int. Cl.
   *H04N 5/376* (2011.01)
   *G02B 7/10* (2006.01)
   *G02B 7/14* (2006.01)
   *H04N 7/015* (2006.01)
(52) U.S. Cl.
   CPC ....... *H04N 5/2254* (2013.01); *H04N 5/23296* (2013.01); *H04N 5/3765* (2013.01); *H04N 5/23287* (2013.01); *H04N 7/015* (2013.01)

(56) References Cited

U.S. PATENT DOCUMENTS

| | | | | |
|---|---|---|---|---|
| 8,203,628 B2* | 6/2012 | Honjo | ............... | G02B 7/102 348/240.99 |
| 8,508,655 B2* | 8/2013 | Suto | ............... | H04N 9/045 348/241 |
| 8,521,016 B2* | 8/2013 | Shibuno | ............... | G03B 13/36 396/133 |
| 8,681,258 B2* | 3/2014 | Katsumata | ............... | G03B 17/14 348/207.99 |
| 8,774,616 B2* | 7/2014 | Nakata | ............... | G03B 3/10 396/103 |
| 8,805,174 B2* | 8/2014 | Kikuchi | ............... | G02B 7/102 396/131 |
| 8,917,983 B2* | 12/2014 | Kawanishi | ............... | G02B 7/102 396/93 |
| 8,953,090 B2* | 2/2015 | Hokkezu | ............... | G02B 7/36 348/231.4 |
| 9,207,428 B2* | 12/2015 | Abe | ............... | G02B 7/282 |
| 9,398,206 B2* | 7/2016 | Uenishi | ............... | H04N 5/23212 |
| 9,507,242 B2* | 11/2016 | Okawa | ............... | G02B 7/102 |
| 9,544,483 B2* | 1/2017 | Nakata | ............... | H04N 5/23209 |
| 9,602,714 B2* | 3/2017 | Kosaka | ............... | H04N 5/23212 |
| 9,667,856 B2* | 5/2017 | Hamada | ............... | H04N 5/23209 |
| 2008/0111900 A1* | 5/2008 | Numako | ............... | H04N 5/23212 348/240.2 |
| 2010/0085470 A1* | 4/2010 | Tsubusaki | ............... | H04N 5/23212 348/345 |
| 2011/0043678 A1* | 2/2011 | Ueda | ............... | G03B 13/36 348/345 |
| 2013/0010373 A1* | 1/2013 | Abe | ............... | G02B 7/102 359/698 |
| 2013/0113985 A1* | 5/2013 | Ikeda | ............... | G02B 7/102 348/347 |
| 2014/0341553 A1* | 11/2014 | Kikuchi | ............... | G02B 7/282 396/81 |
| 2015/0015728 A1* | 1/2015 | Miyazawa | ............... | H04N 5/23296 348/208.4 |
| 2016/0073007 A1* | 3/2016 | Konishi | ............... | H04N 5/23212 348/349 |
| 2016/0227083 A1* | 8/2016 | Imamura | ............... | G03B 17/14 |
| 2016/0309089 A1* | 10/2016 | Hongu | ............... | H04N 5/23212 |
| 2017/0219913 A1* | 8/2017 | Ito | ............... | G03B 13/36 359/823 |
| 2017/0223241 A1* | 8/2017 | Yamatsuta | ............... | H04N 5/2254 348/345 |

* cited by examiner

Fig. 5

| SYNC CONTROL BETWEEN BODY AND LENS (BL SYNC SIGNAL) | | ZOOM TRACKING CONTROL | | |
|---|---|---|---|---|
| FRAME RATE | CONTROL CYCLE | SCALE FACTOR (xN) | FRAME RATE | CONTROL CYCLE |
| 24fps | 41.67ms | 10 | 240fps | 4.167ms |
| 25fps | 40.00ms | 8 | 200fps | 5.000ms |
| 30fps | 33.33ms | 8 | 240fps | 4.167ms |
| 48fps | 20.83ms | 5 | 240fps | 4.167ms |
| 50fps | 20.00ms | 4 | 200fps | 5.000ms |
| 60fps | 16.67ms | 4 | 240fps | 4.167ms |
| 100fps | 10.00ms | 2 | 200fps | 5.000ms |
| 120fps | 8.33ms | 2 | 240fps | 4.167ms |
| 200fps | 5.00ms | 1 | 200fps | 5.000ms |
| 240fps | 4.17ms | 1 | 240fps | 4.167ms |

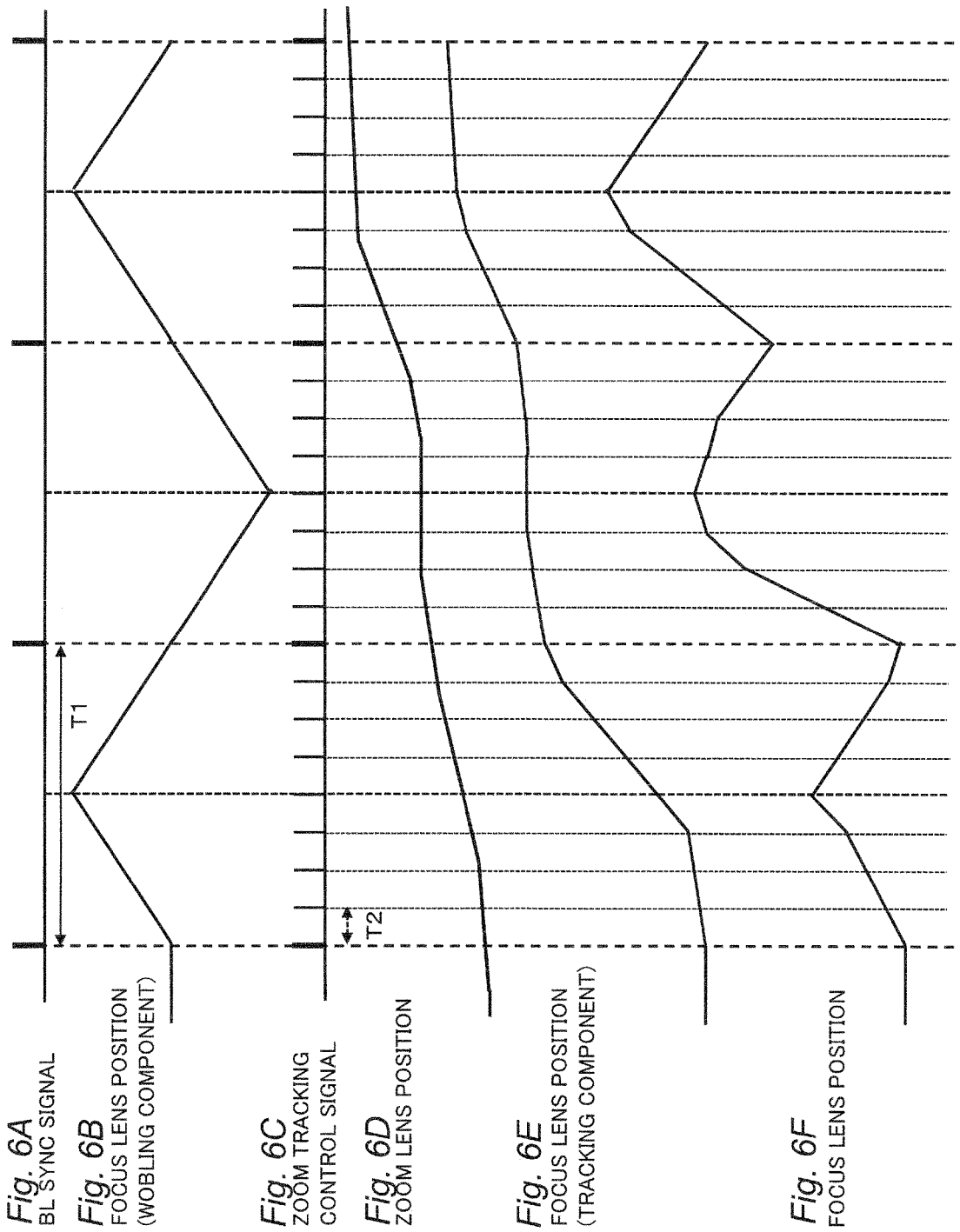

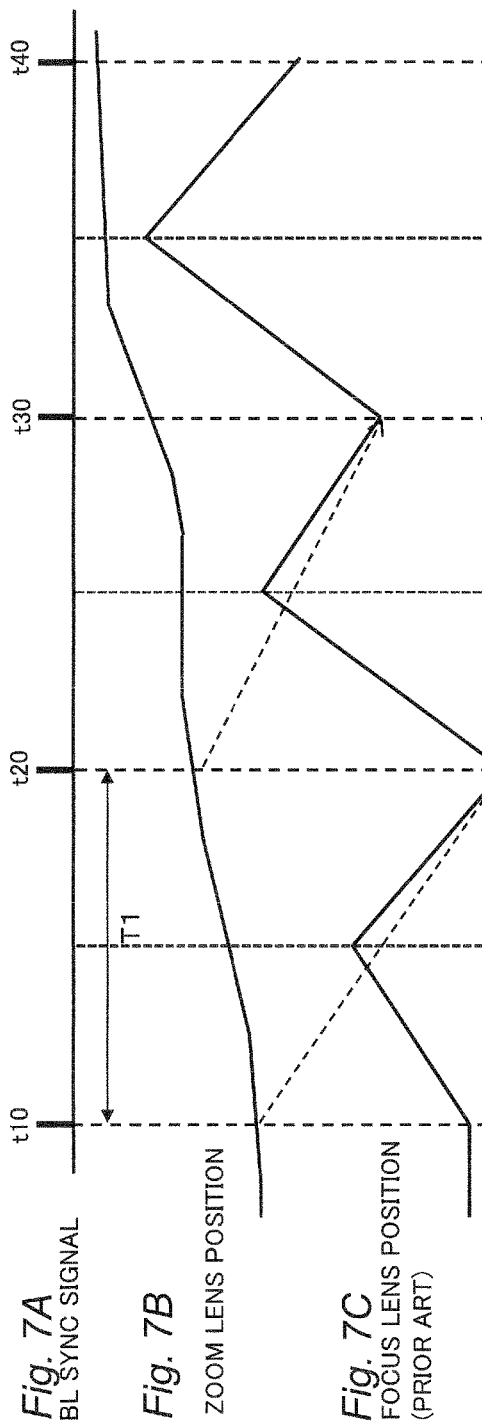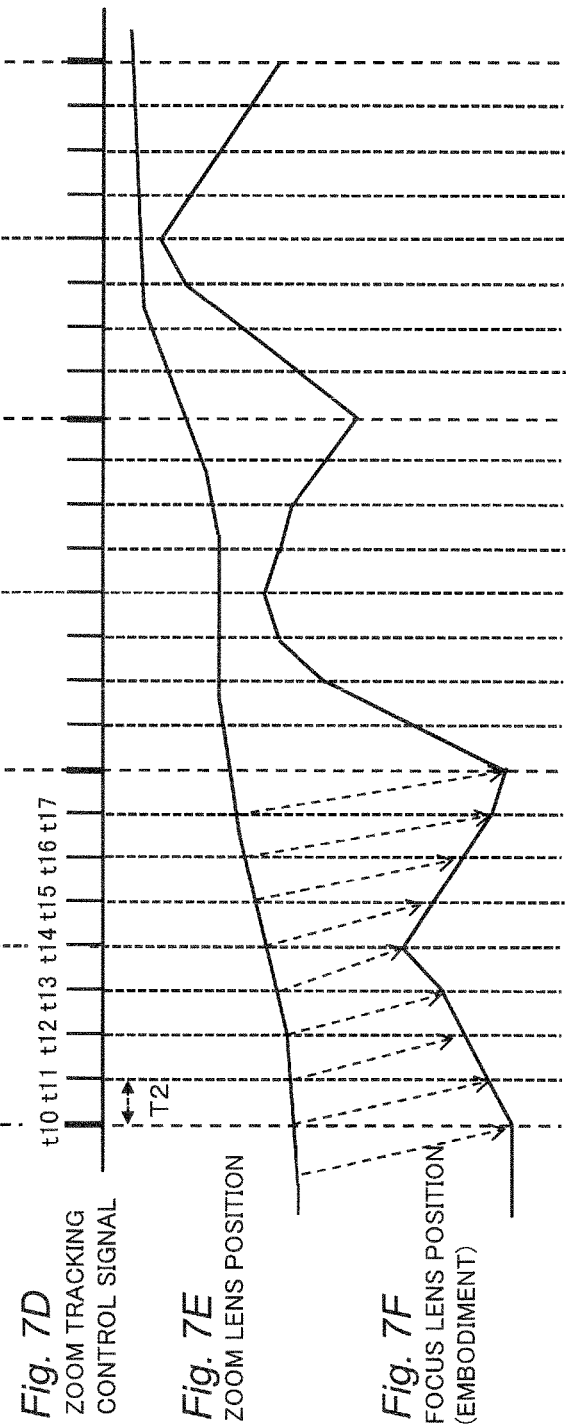

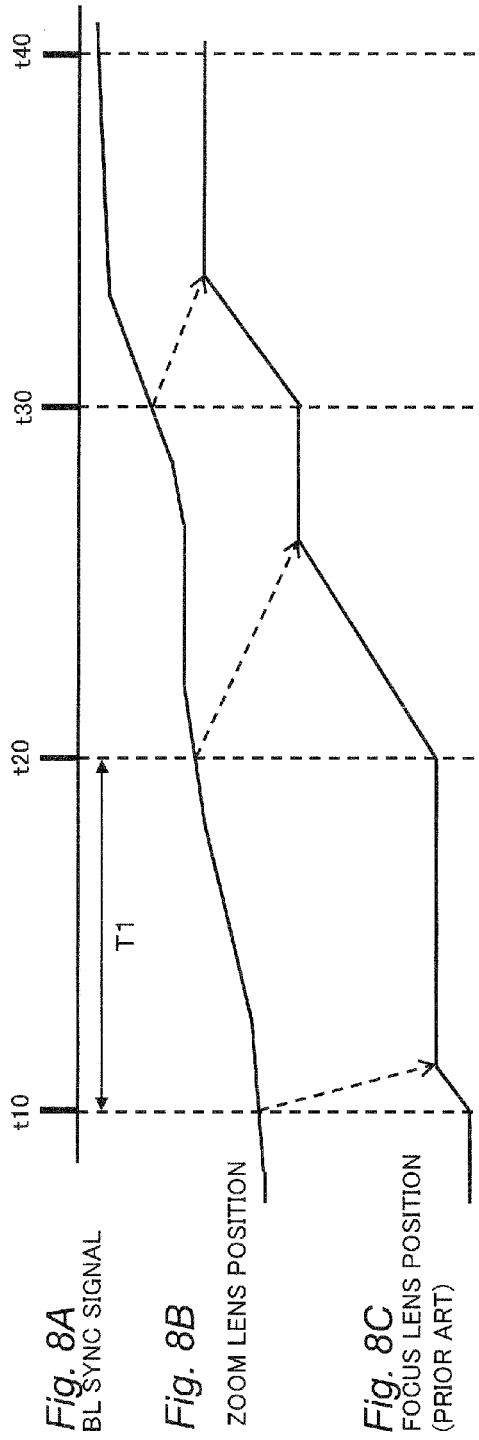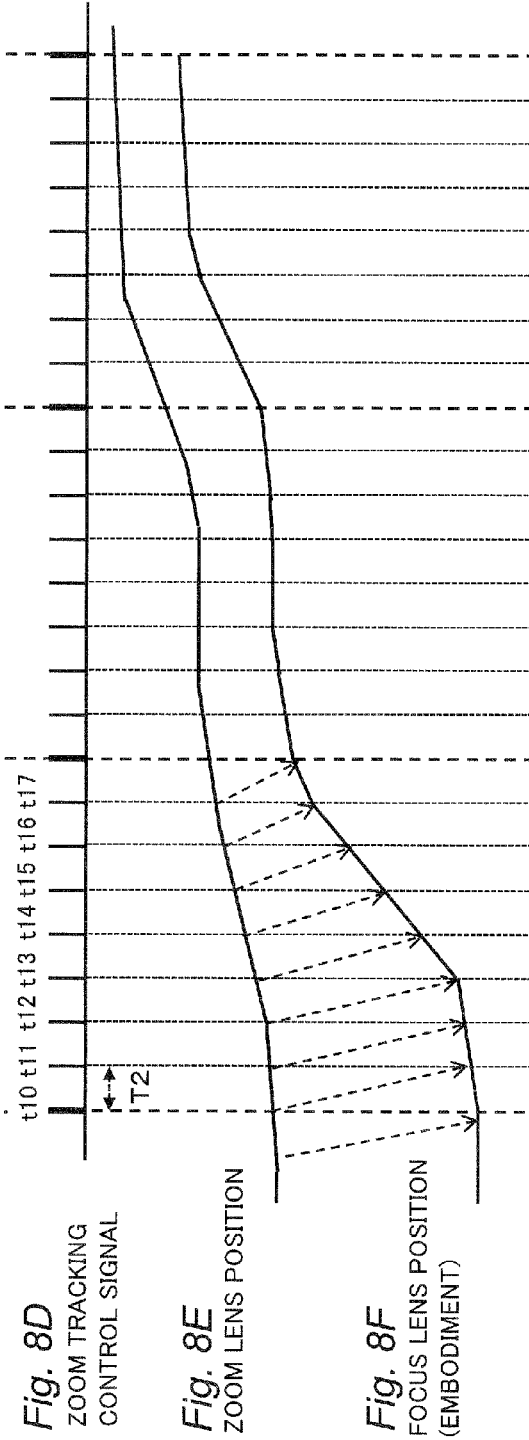

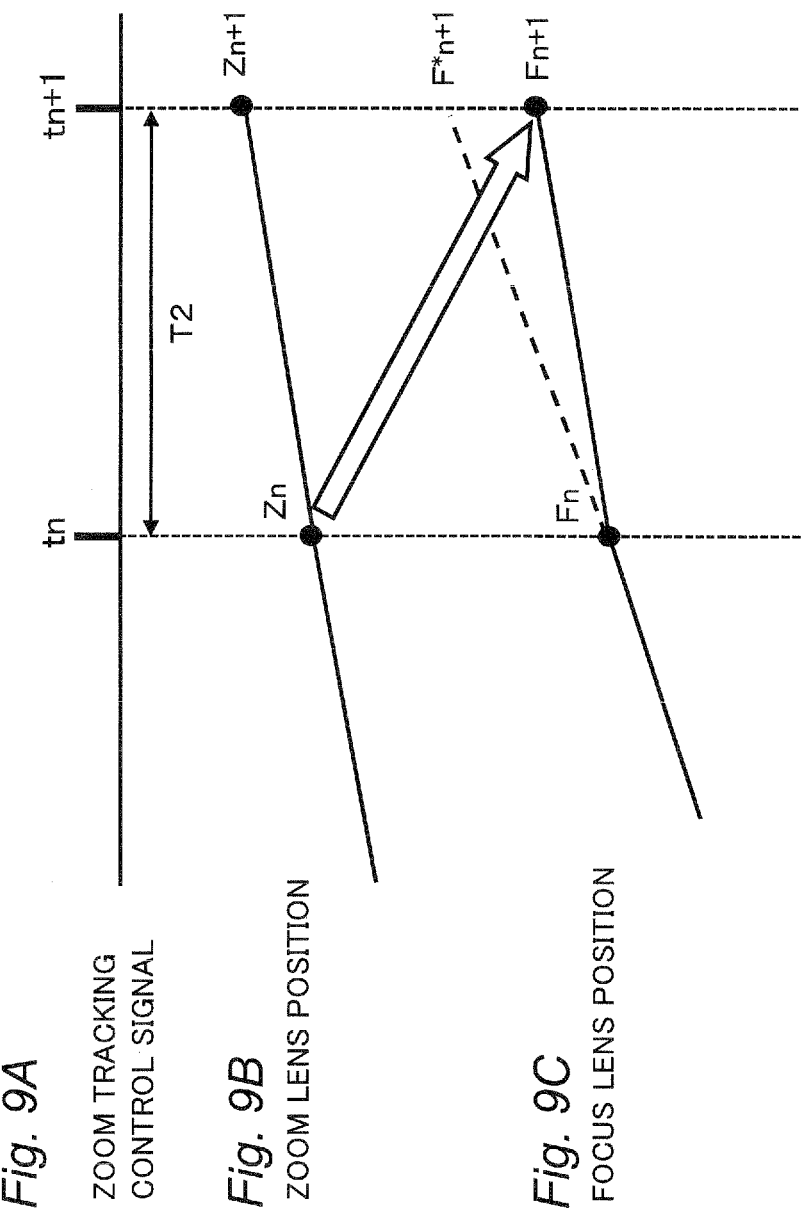

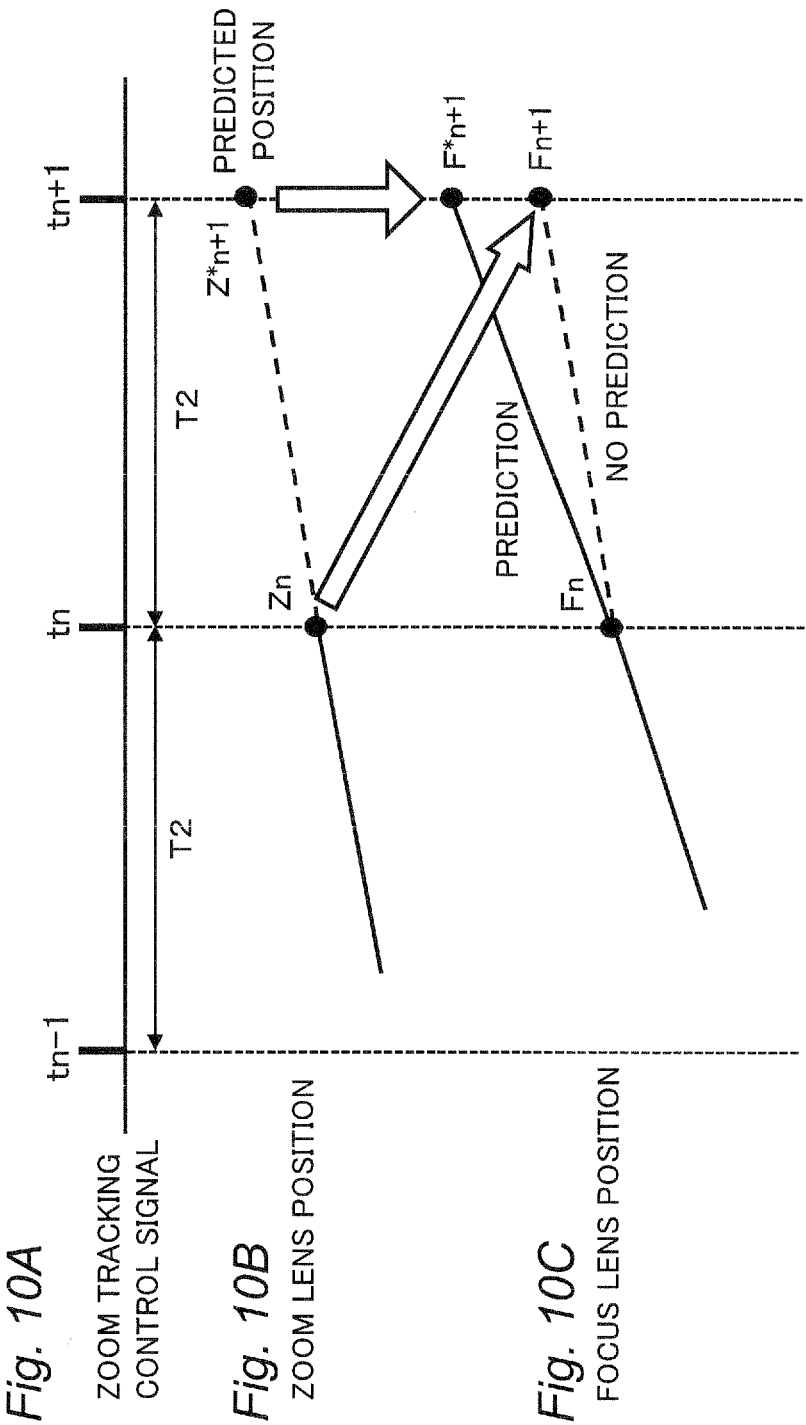

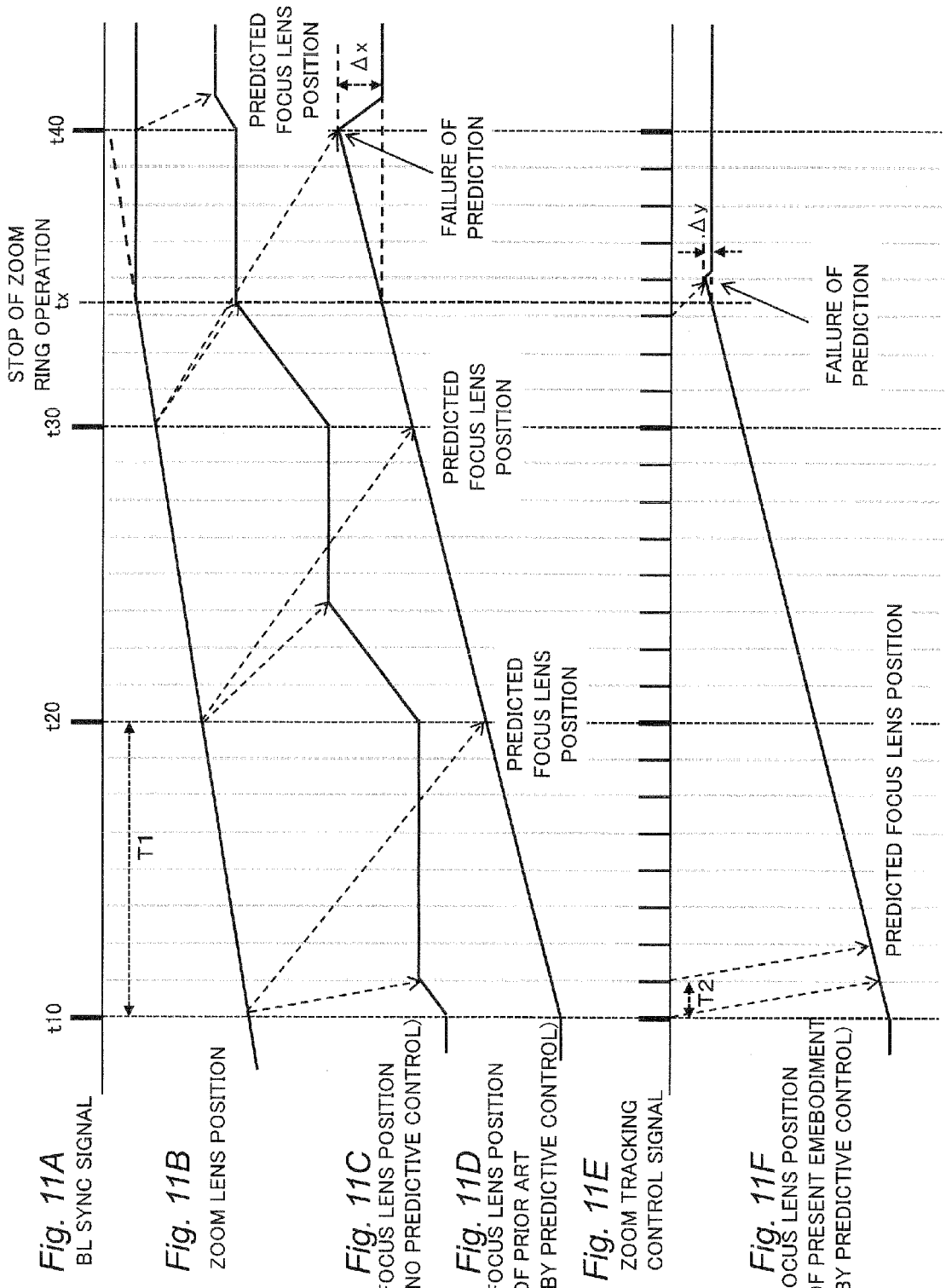

IMAGING APPARATUS INCLUDING ZOOM MECHANISM, AND INTERCHANGEABLE LENS

BACKGROUND

1. Technical Field

The present disclosure relates to an imaging apparatus including a zoom mechanism.

2. Related Art

Japanese Laid-Open Patent Publication No. 8-265619 discloses a video camera that performs zoom tracking control to move a focus lens such to keep an in-focus state when a position of a zoom lens is changed. Specifically, the Japanese Laid-Open Patent Publication No. 8-265619 discloses a video camera including a lens system having a variable magnification lens (i.e., a zoom lens) and a focus lens, a driver for independently moving the variable magnification lens and the focus lens in a direction of an optical axis, a storage unit for storing focus position information of the focus lens corresponding to a position of the variable magnification lens for each of subject distances, a calculating unit for calculating a moving speed of the focus lens in the movement of the variable magnification lens, based on the focus position information stored in the storage unit, and a controller for controlling the driver based on an output of the calculating unit. The video camera operates the calculating unit and the controller plural times for one vertical synchronizing period. Consequently, accurate focus tracking is implemented, even if the zoom speed is high.

SUMMARY

The present disclosure provides an imaging apparatus that performs zoom tracking control capable of controlling in-focus state with high accuracy.

In a first aspect of the present disclosure, the imaging apparatus is provided, including an exchangeable lens and a camera body to which the exchangeable lens is mountable. The camera body includes an imaging unit that captures a subject image received via the interchangeable lens at a predetermined frame rate to generate an image signal, and a first communicating unit that transmits to the interchangeable lens a synchronizing signal having the same cycle as the cycle of the capturing operation in the imaging unit.

The exchangeable lens includes a focus lens, a zoom lens, an operating unit that receives user operation to the zoom lens, a zoom lens driver that moves the zoom lens in accordance with user operation to the operating unit, a position detector that detects a position of the zoom lens, a storage unit that stores relation information relating a position of the zoom lens to a focus position of the focus lens, a focus lens driver that drives the focus lens, a controller that controls the focus lens driver, and a second communicating unit that receives the synchronizing signal from the camera body.

The controller performs a zoom tracking control by determining the focus position of the focus lens from the position of the zoom lens detected by the position detector by referring to the relation information, and controlling the focus lens driver to move the focus lens to the determined focus position. The controller performs the zoom tracking control in a cycle (for example, 1/n (n: integer)) shorter than a cycle indicated by the synchronizing signal received via the communication unit of the exchangeable lens.

In a second aspect of the present disclosure, an imaging apparatus is provided, including an exchangeable lens and a camera body to which the exchangeable lens is mountable. The camera body includes an imaging unit that captures a subject image received via the interchangeable lens at a predetermined frame rate to generate an image signal, and a first communicating unit that transmits to the interchangeable lens a synchronizing signal having the same cycle as the cycle of the capturing operation in the imaging unit.

The exchangeable lens includes a focus lens, a zoom lens, a zoom lens driver that moves the zoom lens, a storage unit that stores relation information relating a position of the zoom lens to a focus position of the focus lens, a focus lens driver that drives the focus lens, a controller that controls the focus lens driver, and a second communicating unit that receives the synchronizing signal from the camera body.

The controller performs, when moving the zoom lens, a zoom tracking control by determining the focus position of the focus lens from the position of the zoom lens by referring to the relation information, and controlling the focus lens driver to move the focus lens to the determined focus position.

The controller performs the zoom tracking control in a cycle shorter than a cycle indicated by the synchronizing signal received via the second communication unit.

According to the imaging apparatus of the present disclosure, the zoom tracking control is performed in a shorter cycle than the cycle indicated by the synchronizing signal communicated between the camera body and the interchangeable lens. Therefore, it is possible to perform the accurate zoom tracking following an actual position of the zoom lens. As a result, it is possible to obtain an in-focus state with high accuracy.

BRIEF DESCRIPTION OF DRAWINGS

FIG. 5 illustrates a relationship between a cycle of a BL synchronizing signal and a cycle of zoom tracking control;

FIGS. 6A-6F illustrate an example of a fluctuation in positions of a zoom lens and a focus lens with a zoom operation at an AF operation (wobbling operation) by the digital camera;

FIGS. 7A-7F illustrate a difference in control of the focus lens between tracking control and conventional zoom tracking control, in the autofocus operation (wobbling operation);

FIGS. 8A-6F illustrate a difference in control of the focus lens between zoom tracking control according to the present embodiment and the conventional zoom tracking control, in a manual focus operation;

FIGS. 9A-9C illustrate a delay of the zoom tracking control;

FIGS. 10A-10C illustrate zoom tracking control based on a predicted position of the zoom lens;

FIGS. 11A-11F illustrate a prediction error in the zoom tracking control; and

DETAILED DESCRIPTION OF PREFERRED EMBODIMENT

Embodiments will be described below in detail with reference to the drawings. However, unnecessary detailed description will be omitted in some cases. For example, detailed description of well-known matters or repetitive description of substantial identical structures will be omitted in some cases. This is intended for avoiding unnecessary redundancy of the following description and causing a person skilled in the art to facilitate the understanding.

The inventor(s) provide(s) the accompanying drawings and the following description for causing a person skilled in the art to fully understand the present disclosure and it is not intended that subject matters recited in claims are not thereby restricted to the accompanying drawings and the following description.

First Embodiment 1-1. Configuration

Figure 1:
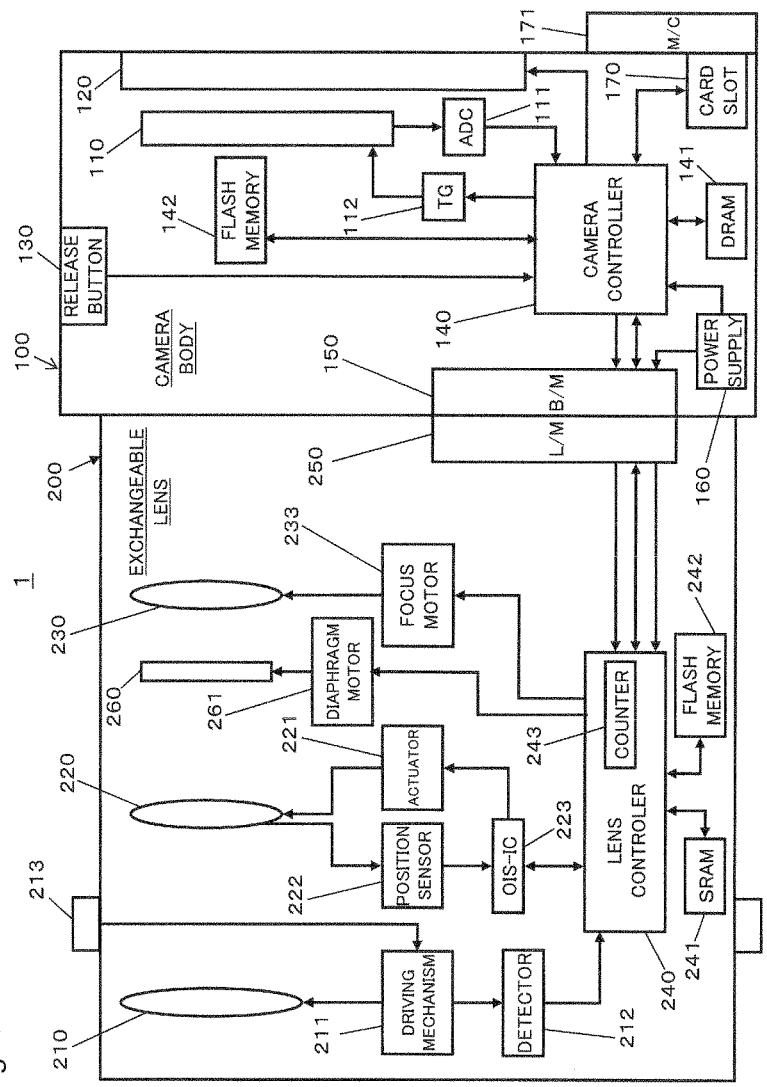
FIG. 1 illustrates a configuration of a digital camera according to an embodiment of the present discourse.

FIG. 1 illustrates a configuration of a digital camera 1 according to the present embodiment. The digital camera 1 can record still image and moving image of higher definition such as 4K in addition to those of full high definition (FHD). As shown in FIG. 1, the digital camera 1 includes a camera body 100 and an interchangeable lens 200. The interchangeable lens 200 is provided with a zoom ring 213 that a user operates for a zoom operation. The user manually (not electrically) rotates the zoom ring 213 to perform the zoom operation.

The following embodiments describe the configuration of the digital camera 1 that includes an interchangeable lens capable of performing a manual zoom operation and can perform an accurate zoom tracking operation in zooming.

1-1-1. Camera Body

The camera body 100 includes a CMOS image sensor 110, a liquid crystal monitor 120, a camera controller 140, a body mount 150, a power supply 160, and a card slot 170.

The camera controller 140 controls a whole operation of the digital camera 1 in response to an instruction given from an operating member such as a release button 130, such as controlling the CMOS image sensor 110 or the like. The camera controller 140 transmits a vertical synchronizing signal (VD) to a timing generator 112. Concurrently therewith, the camera controller 140 generates a synchronizing signal synchronized with the vertical synchronizing signal, and transmits the synchronizing signal to a lens controller 240 via the body mount 150 and a lens mount 250. The synchronizing signal to transmitted from the camera body 100 to the interchangeable lens 200 will be hereinafter referred to as a "BL synchronizing signal". The camera controller 140 uses a DRAM 141 as a work memory in a control operation or an image processing operation.

The CMOS image sensor 110 is an image sensor for capturing a subject image input via the interchangeable lens 200 to generate an analog image signal. The generated analog image signal is converted into digital image data by an AD converter (ADC) 111. The image data converted by the AD converter 111 is subjected to various image processes by the camera controller 140. The various image processes may include, for example, a gamma correction, a white balance correction, a flaw correction, a YC conversion, an electronic zoom, and an image compression such as a JPEG compression.

The CMOS image sensor 110 operates in synchronism with a timing controlled by the timing generator 112. Specifically, the CMOS image sensor 110 performs a capturing operation at a timing synchronized with the vertical synchronizing signal (i.e., in a cycle (a capturing cycle) indicated by the vertical synchronizing signal). The operation of the CMOS image sensor 110 includes a still image capturing operation, a moving image capturing operation, a through image capturing operation, and the like. The through image is an image which is not recorded in a memory card 171 after capturing. The through image is mainly a moving image and is displayed on a liquid crystal monitor 120 in order to determine a composition for shooting a still image.

The liquid crystal monitor 120 displays an image indicated by image data for display, which is processed by the camera controller 140. The liquid crystal monitor 120 can also display a moving image and a still image selectively.

The card slot 170 is loaded with a memory card 171. The card slot 170 controls the memory card 171 under control of the camera controller 140. That is, image data generated by an image process of the camera controller 140 is stored in the memory card 171. The memory card 171 can store various image files such as a JPEG image file. Moreover, image data or image files stored in the memory card 171 can be read from the memory card 171. The image data or image files read from the memory card 171 are subjected to the image process by the camera controller 140. For example, the camera controller 140 decompresses the image data or image files acquired from the memory card 171 to generate image data for display.

The power supply 160 supplies power to be consumed in the digital camera 1. The power supply 160 may be a dry battery or a rechargeable battery, for example. Moreover, the power supply 160 may supply external power to the digital camera 1 through a power cord.

The body mount 150 can be connected to the lens mount 250 of the interchangeable lens 200 mechanically or electrically. The body mount 150 can exchange data with the interchangeable lens 200 via the lens mount 250. The body mount 150 transmits an exposure synchronizing signal received from the camera controller 140, to the lens controller 240 via the lens mount 250. Furthermore, the body mount 150 transmits other control signals received from the camera controller 140, to the lens controller 240 via the lens mount 250. Moreover, the body mount 150 transmits, to the camera controller 140, the signal received from the lens controller 240 via the lens mount 250.

1-1-2. Interchangeable Lens

The interchangeable lens 200 includes an optical system, the lens controller 240, and the lens mount 250. The optical system of the interchangeable lens 200 includes a zoom lens 210, an OIS lens 220, a diaphragm 260, and a focus lens 230.

The zoom lens 210 serves to change a magnification of a subject image to be formed by the optical system of the interchangeable lens 200. The zoom lens 210 is composed of one or more lenses. A drive mechanism 211 is a mechanism for moving the zoom lens 210 mechanically (not electrically) working with the movement of the zoom ring 213 which can be rotated by a user. The drive mechanism 211 moves the zoom lens 210 along a direction of an optical axis of the optical system, based on the operation of the zoom ring 213 by the user.

A detector 212 detects a moving or driving amount of the zoom lens by the drive mechanism 211. Moreover, the detector 212 detects a position of the zoom ring 213, that is, a position of the zoom lens 210. The lens controller 240 can grasp a zoom magnification in the optical system, a position of the zoom lens 210 and a position, a rotating amount, and a rotating speed of the zoom ring 213, by acquiring a detection result from the detector 212.

The OIS lens 220 serves to correct a blur of a subject image to be formed by the optical system of the interchangeable lens 200. The OIS lens 220 moves in such a direction as to cancel camera shake of the digital camera 1 thereby to reduce the blur of the subject image on the CMOS image sensor 110. The OIS lens 220 is composed of one or more lenses. An actuator 221 drives the OIS lens 220 in a plane perpendicular to the optical axis of the optical system under control of an IC 223 for OIS. A position sensor 222 serves to detect a position of the OIS lens 220 in the plane perpendicular to the optical axis of the optical system. The IC 223 for OIS controls an actuator 221 based on the detection result of the position sensor 222 and the detection result of a camera shake sensor such as a gyro sensor.

The diaphragm 260 is a member for regulating an amount of light passing through the optical system. The diaphragm 260 includes a plurality of diaphragm blades, for example, and can regulate the light amount by opening and closing an opening portion configured with the blades.

The focus lens 230 serves to change an in-focus state of a subject image formed on the CMOS image sensor 110 by the optical system. The focus lens 230 is composed of one or more lenses.

A focus motor 233 drives the focus lens 230 to cause the focus lens 230 to move forward and backward along the optical axis of the optical system, under the control of the lens controller 240. With this, it becomes possible to change the in-focus state of the subject image to be formed on the CMOS image sensor 110 by the optical system. In the present embodiment, a stepping motor is used as the focus motor 233. The focus motor is not restricted to a stepping motor, but may be a DC motor, an ultrasonic motor, or a linear motor.

The lens controller 240 controls the whole interchangeable lens 200 based on a control signal sent from the camera controller 140, such as controlling the IC 223 for OIS and the focus motor 233. For example, the lens controller 240 controls the focus motor 233 to move the focus lens 230 forward and backward along the optical axis by a predetermined driving method, based on the control signal from the camera controller 140 (wobbling control). Moreover, the lens controller 240 receives signals from the detector 212, the IC 223 for OIS, and the like, and then transmits the signal to the camera controller 140. Data is communicated between the lens controller 240 and the camera controller 140 via the lens mount 250 and the body mount 150.

The lens controller 240 uses an SRAM 241 as a work memory. Furthermore, a flash memory 242 stores programs and parameters to be used for the control of the lens controller 240. For example, the flash memory 242 stores zoom tracking information (detailed below) indicative of a relationship between the position of the zoom lens and the focus position of the focus lens.

The camera controller 140 and the lens controller 240 execute programs to implement predetermined functions. The program to be executed may be provided to the digital camera 1 by a recording medium such as a DVD-ROM or a CD-ROM or downloaded from a server on a network via a communication line. While the functions of the camera controller 140 and the lens controller 240 are implemented by cooperation of hardware and software (an application program), they may be implemented by only a hardware circuit designed specially to implement a predetermined function. A controller 11 can be configured with a DSP, an FPGA, an ASIC, or the like, other than a CPU or an MPU.

1.2. Operation

Operation of the digital camera 1 having the aforementioned configuration will be described below.

1-2-1. Wobbling Control

The digital camera 1 executes an autofocus operation by a contrast AF method. In the autofocus operation at moving-image capturing, wobbling control is performed for moving the focus lens 230 to a direction of a focus position while moving the focus lens 230 forward and backward along the optical axis by a very short distance.

Figure 2:
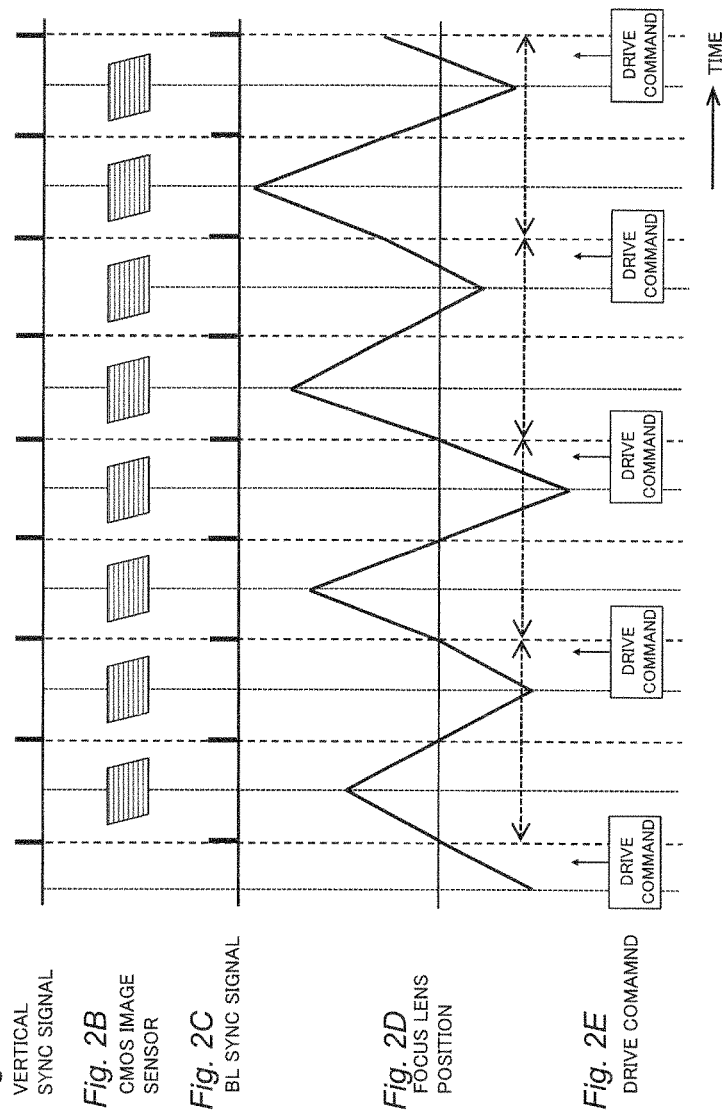
FIGS. 2A-2E illustrate a wobbling operation by the digital camera.

FIGS. 2A to 2E illustrates a wobbling operation in the digital camera 1. FIG. 2A shows a vertical synchronizing signal generated by the camera controller 140 of the camera body 100. FIG. 2B shows an imaging state brought by the CMOS image sensor 110. FIG. 2C shows a BL synchronizing signal transmitted from the camera body 100 to the interchangeable lens 200. FIG. 2D shows a position of the focus lens 230 changed by the wobbling operation. FIG. 2E shows a driving command for the wobbling control to be transmitted to the lens controller 240 of the interchangeable lens 200 by the camera controller 140 of the camera body 100.

As shown in FIGS. 2A and 2B, in the camera body 100, the CMOS image sensor 110 captures a subject image in synchronization with the vertical synchronizing signal (VD). At the same time, in the interchangeable lens 200, the focus lens 230 is subjected to the wobbling control in synchronization with the capturing operation by the CMOS image sensor 110 as shown in FIGS. 2C and 2D. Specifically, the lens controller 240 receives the driving command for the wobbling control from the camera controller 140. The lens controller 240 performs the wobbling control on the focus lens 230 in accordance with the driving command. At this time, when an image in a predetermined AF region is captured by the CMOS image sensor 110, the focus lens 230 is driven such that the displacement of the focus lens 230 is maximized. Consequently, a contrast value can be detected in the AF region. The lens controller 240 performs the wobbling control synchronously with the BL synchronizing signal received from the camera controller 140 (see FIG. 2E). In an example shown in FIG. 2E, the driving command is received every two periods.

1-2-2. Zoom Tracking Control

When the zoom lens 210 is driven in an in-focus state (when a zoom operation is performed), an out-of-focus state is brought into the CMOS image sensor 110 if the focus lens 230 is maintained to be stopped. Therefore, when the zoom lens 210 is driven in the in-focus state, the focus lens 230 is also moved depending on the movement of the zoom lens 210. Such control is referred to as "zoom tracking control". Even when the zoom lens 210 is driven in the zoom tracking control, an image can be captured in the in-focus state.

Figure 3:
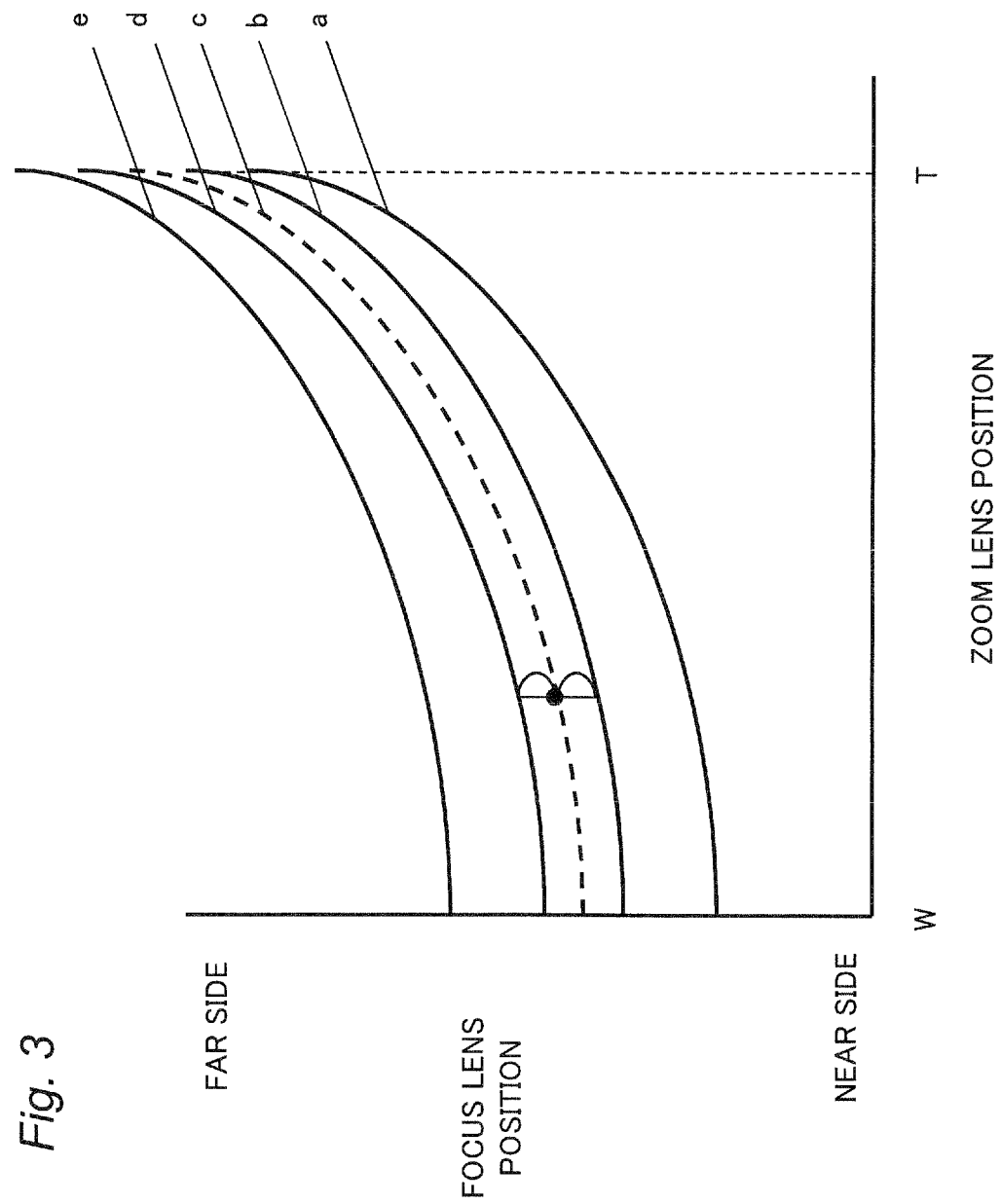
FIG. 3 illustrates zoom tracking information.

In the zoom tracking control, a position of the focus lens 230 is determined depending on a position of the zoom lens 210. A relationship between the position of the zoom lens 210 and that of the focus lens 230 for maintaining the in-focus state is defined by the zoom tracking information. FIG. 3 illustrates zoom tracking information stored in the flash memory 242. The zoom tracking information is composed of a plurality of zoom tracking curves for each of distances (subject distances) to a subject. In the example of FIG. 3, the zoom tracking information includes information about four zoom tracking curves a, b, d, and e. In the zoom tracking control, the lens controller 240 determines the position of the focus lens based on the position of the zoom lens 210 detected by the detector 212 and the zoom tracking curves.

When driving the zoom lens 210 in the in-focus state, the lens controller 240 selects any of the zoom tracking curves according to the subject distance to drive the focus lens 230 along the zoom tracking curve in accordance with a change in a the zoom lens position.

When a zoom tracking curve corresponding to a desirable subject distance is not stored in the flash memory 242, a focus lens position for the desirable subject distance is calculated from zoom tracking curves corresponding to two subject distances which are close to the subject distance. For example, when the desirable subject distance is placed between a subject distance of the zoom tracking curve b and that of the zoom tracking curve d, a virtual zoom tracking curve c is calculated by interpolation from the zoom tracking curves b and d. The focus lens 230 is driven along the virtual zoom tracking curve c. Hence, even when a zoom tracking curve of the corresponding subject distance is not stored in the flash memory 242, a zoom tracking operation can be performed for any optional subject distance and a zoom operation can be carried out while keeping the in-focus state.

FIGS. 4A to 4D illustrate an execution timing of the zoom tracking control by the digital camera 1 according to the present embodiment.

Figure 4:
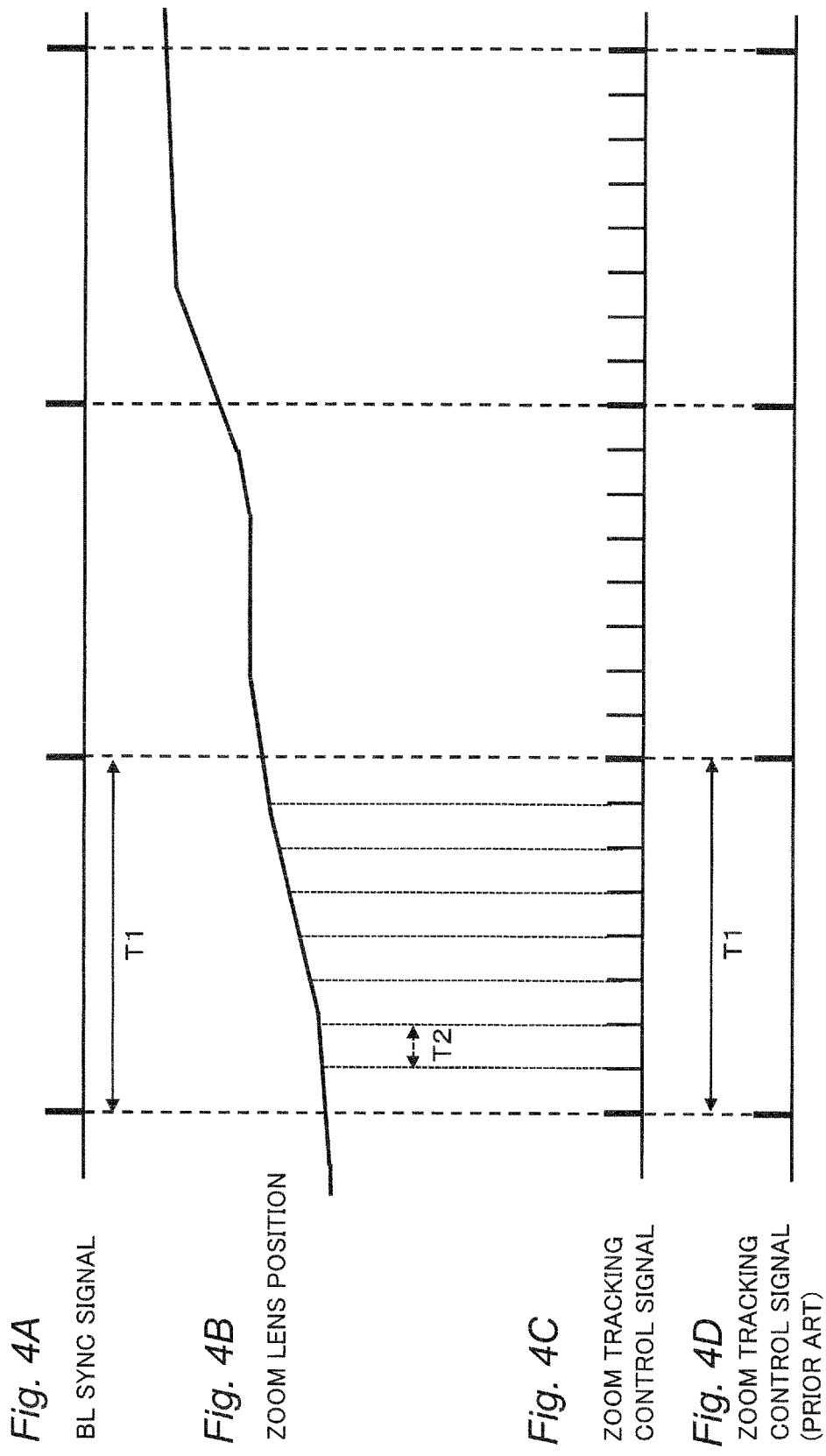
FIGS. 4A-4D illustrate a timing of zoom tracking control by the digital camera according to the present disclosure.

FIG. 4A shows a BL synchronizing signal transmitted from the camera controller 140 of the camera body 100 to the lens controller 240 of the interchangeable lens 200. FIG. 4B shows a change in the zoom lens position along with a zoom operation performed by a user. FIG. 4C shows a control signal for providing an execution timing of the zoom tracking control in the interchangeable lens 200 according to the present embodiment. FIG. 4D shows a control signal for providing an execution timing of conventional zoom tracking control.

The BL synchronizing signal shown in FIG. 4A serves to synchronize the operation of the interchangeable lens 200 with that of the camera body 100. The lens controller 240 of the interchangeable lens 200 performs the autofocus operation based on the BL synchronizing signal. The BL synchronizing signal is generated synchronously with a vertical synchronizing signal (VD) generated in the camera body 100, based on the vertical the synchronizing signal (VD).

In particular, the digital camera 1 according to the present embodiment sets the control cycle of the zoom tracking control to a 1/x cycle (x: integral multiplication) (a ⅛ cycle in the present example) of the BL synchronizing signal as shown in FIG. 4C. That is, the zoom tracking control is performed in a frame rate which is integer multiple (e.g., eight times) of the frame rate of the BL synchronizing signal.

As shown in FIG. 4D, conventionally, the zoom tracking control is executed in the same cycle as the BL synchronizing signal in the interchangeable lens 200. For this reason, in the wobbling control at moving image shooting, when the cycle of the BL synchronizing signal is large, the zoom tracking for the zoom operation is delayed and a moving image which is out of focus is captured, resulting in a problem. Especially, when recording a moving image with high definition such as 4K, degradation of image quality caused by such delay of zoom tracking occurs dominantly. To take a countermeasure against the problem, in the present embodiment, the zoom tracking control is executed in a 1/x cycle (x: integral multiplication) (e.g. a ⅛ cycle) of the BL synchronizing signal in the interchangeable lens 200 as shown in FIG. 4C. In this way, the cycle of the zoom tracking control is set to be smaller than the control cycle of the BL synchronizing signal to be transmitted from the camera body 100 to the interchangeable lens 200. Consequently, it is possible to perform accurate zoom tracking following an actual zoom lens position. Thus, the in-focus state can be obtained with high accuracy.

FIG. 5 illustrates a relationship between a cycle (T1) of the BL synchronizing signal and a cycle (T2) of the zoom tracking control, which can be set in the digital camera 1.

For example, in the case in which the frame rate is 24 fps in the camera body 100, for example, the cycle of the BL synchronizing signal is set to 41.67 ms which is a capturing cycle corresponding to the frame rate of 24 fps. In this case, the cycle of the zoom tracking control in the interchangeable lens 200 is set to 4.167 ms which is one-tenth of the cycle of the EL synchronizing signal. That is, in the interchangeable lens 200, the process is executed at a frame rate of 240 fps (ten times).

In the case in which the frame rate is 30 fps in the camera body 100, moreover, the cycle of the BL synchronizing signal is set to 33.33 ms. In this case, in the interchangeable lens 200, the cycle of the zoom tracking control is set to 4.167 ms which is one-eighth of the cycle of the BL synchronizing signal. That is, in the interchangeable lens 200, the process is executed at a frame rate of 240 fps (eight times). A value of the frame rate or the like shown in FIG. 5 is illustrative and the value of the frame rate or the like is not restricted to the value as shown in FIG. 5.

In the interchangeable lens 200, information indicative of a relationship between the cycle of the BL synchronizing signal and the cycle of the zoom tracking control as shown in FIG. 5 is stored in the flash memory 242. The lens controller 240 receives the information indicative of the cycle of the BL synchronizing signal from the camera controller 140 of the camera body 100. The lens controller 240 sets the control cycle in the zoom tracking control based on the cycle of the BL synchronizing signal received from the camera body 100 by referring to the received information, and executes the zoom tracking control in the set control cycle.

FIGS. 6A to 6F illustrate an example of a fluctuation in positions of the zoom lens 210 and the focus lens 230 in the execution of the zoom operation by a user at the AF operation (wobbling operation) in the digital camera 1 according to the present embodiment.

FIG. 6A shows the BL synchronizing signal in a cycle T1 (e.g., 33.33 ms). FIG. 6B shows a fluctuation component of the focus lens 230 caused by the wobbling control. FIG. 6C shows a zoom tracking control signal in a cycle T2 (e.g., 4.167 ms) which is one-eighth of the cycle T1. FIG. 6D shows a change in the position of the zoom lens 210 along with the operation of the zoom ring 213 by the user. FIG. 6F shows a change in the focus lens 230 obtained by adding a fluctuation component (FIG. 6B) of the focus lens 230 caused by the wobbling control and a fluctuation component (FIG. 6E) of the focus lens 230 caused by the zoom tracking control.

The lens controller 240 performs the wobbling control as shown in FIG. 6B on the focus lens 230 synchronously with the BL synchronizing signal. At the same time, the lens controller 240 performs the zoom tracking control in conjunction with the movement of the zoom lens 210 caused by the operation of the zoom ring 213 by the user to move the focus lens 230 (see FIG. 6E). As a result, the fluctuation component of the focus lens 230 caused by the wobbling control (see FIG. 6B) and the fluctuation component of the focus lens 230 caused by the zoom tracking control (see FIG. 6E) are added so that the focus lens 230 is moved as shown in FIG. 6F.

With reference to FIGS. 7A to 7F and 8A to 8F, a difference in the movement of the focus lens 230 between the zoom tracking control according to the present embodiment and the conventional zoom tracking control is described.

FIGS. 7A to 7B illustrate a difference in the control of the focus lens 230 between the zoom tracking control according to the present embodiment and the conventional zoom tracking control, in the autofocus operation (the wobbling operation).

FIG. 7A shows a BL synchronizing signal in a cycle T1 (e.g., 33.33 ms). FIG. 7B shows a change in the position of the zoom lens 210 in conjunction with the operation of the zoom ring 213 by the user. FIG. 7C shows a fluctuation in the position of the focus lens 230 when the zoom tracking control (the conventional tracking control) is performed in the same cycle as the BL synchronizing signal. FIG. 7D shows a zoom tracking control signal according to the present embodiment. FIG. 7E shows a change in the position of the zoom lens 210 in conjunction with the operation of the zoom ring 213 by the user, similar to as FIG. 7B. FIG. 7F shows a change in the position of the focus lens 230 when the zoom tracking control (the zoom tracking control according to the present embodiment) is performed in a shorter cycle T2 (e.g., 4.167 ms) than the cycle of the BL synchronizing signal.

When the zoom tracking operation is performed in the same cycle as the cycle T1 of the BL synchronizing signal, the result of the zoom tracking (a fluctuation component of the focus position) based on the zoom lens position detected in a previous cycle is reflected on the position of the focus lens 230 after one cycle T1 of the BL synchronizing signal, as shown in FIG. 7C. For example, the result of the zoom tracking based on the position of the zoom lens at a time t10 is reflected on the focus lens position at a time t20 after one cycle T1.

On the other hand, when the zoom tracking operation is performed in the cycle (zoom tracking control cycle) T2 which is one-eighth of the cycle T1 of the BL synchronizing signal as described in the present embodiment, the result of the zoom tracking based on the zoom lens position detected in a previous cycle is reflected on the position of the focus lens 230 after the cycle T2 shorter than the cycle T1, as shown in FIG. 7F. For example, the result of the zoom tracking based on the position of the zoom lens at a time t11 is reflected on the focus lens position at a time t12 after one cycle T2 (which is one-eighth of the cycle T1). As compared with the conventional zoom tracking control shown in FIG. 7C, the zoom tracking can be performed at a smaller interval. Consequently, it is possible to perform accurate zoom tracking following the actual zoom lens position, resulting in an highly accurate in-focus state.

FIGS. 8A to 8F illustrate a difference in the control of the focus lens 230 between the zoom tracking control according to the present embodiment and the conventional zoom tracking control, in a manual focus operation. In the case of the manual focus operation, the user can perform the focus operation by operating a focus ring (not shown) attached to the interchangeable lens 200. The wobbling control for the focus lens 230 is not carried out.

FIG. 8A shows the BL synchronizing signal in the cycle T1 (e.g., 33.33 ms). FIGS. 8B and 8E show a change in the position of the zoom lens 210 along with the operation of the zoom ring 213 by the user. FIG. 8C shows a change in the position of the focus lens 230 when the zoom tracking control (the conventional tracking control) is performed in the same cycle as the BL synchronizing signal. FIG. 8D shows the zoom tracking control signal according to the present embodiment. FIG. 8F shows a change in the position of the focus lens 230 when the zoom tracking control (the zoom tracking control according to the present embodiment) is performed in a cycle T2 (e.g., 4.167 ms) shorter than the cycle of the BL synchronizing signal.

When the user operates the zoom ring 213 to perform the zoom operation, the zoom lens 210 is moved as shown in FIG. 8B by the drive mechanism 211. In this case, when the zoom tracking operation is performed in the same cycle as the cycle T1 of the GL synchronizing signal as in the prior art, the result of the zoom tracking (a fluctuation component of the focus position) is reflected on the position of the focus lens 230 only once within one cycle as shown in FIG. 8C.

On the other hand, when the zoom tracking operation is performed in the cycle (zoom tracking control cycle) T2 which is one-eighth of the cycle T1 of the BL synchronizing signal as in the present embodiment, the zoom tracking is performed at a smaller interval as shown in FIG. 8F in the same manner as in the case of the autofocus operation. Consequently, it is possible to perform the accurate zoom tracking following the actual zoom lens position, resulting in a highly accurate in-focus state.

In the example described above, the lens controller 240 determines a target moving position of the focus lens 230 in the zoom tracking by referring to the tracking information shown in FIG. 3 based on the position of the zoom ring 213 detected by the detector 212. In this case, the following problem arises. As shown in FIGS. 9A to 9C, the lens controller 240 determines a position Fn+1 of the focus lens 230 by referring to a zoom tracking curve based on a position Zn of the zoom lens 210 detected by the detector 212 at a certain time tn, and moves the focus lens 230 to the determined position Fn+1. According to such a control, the focus lens 230 is moved to the position Fn+1 at a time tn+1 after one cycle (T2) of the zoom tracking control. At the time tn+1, however, the zoom lens 210 is actually moved to a position Zn+1. For this reason, the focus lens 230 should be originally placed in a position F*n+1 determined based on the zoom lens position Zn+1. Thus, the position Fn+1 of the focus lens 230 determined based on the zoom lens position Zn is not reflected and calculated by the actual position Zn+1 of the zoom lens 210, and is shifted from the original position F*n+1 of the focus lens. For this reason, it would be impossible to obtain the in-focus state with high accuracy after the zoom tracking control in some cases.

Therefore, as shown in FIGS. 10A to 10C, the lens controller 240 may predict a position Z*n+1 of the zoom lens 210 at a time tn+1 after one cycle (T2) upon the detection of the zoom lens position at a time tn, and perform the zoom tracking control by using the predicted zoom lens position Z*n+1. The predicted position of the zoom lens 210 can be, for example, obtained based on moving amounts of the zoom lens 210 in a predetermined number of past cycles. The predicted position Z*n+1 of the zoom lens 210 may be calculated in accordance with, for example, the following equation:

$$Z*_{n+1} = Z_n + \alpha \times \Delta Z,$$

where Zn represents a current position of the zoom lens which is detected by the detector 212, α represents a coefficient, and ΔZ represents an average value of the moving amount in one cycle of the zoom lens 210 which is calculated based on a predetermined number of past cycles.

The lens controller 240 may obtain a focus lens position F*n+1 based on the predicted zoom lens position Z*n+1 by referring to the zoom tracking curve and move the focus lens 230 to the obtained position F*n+1. Consequently, the position of the focus lens 230 can be determined with higher accuracy in the zoom tracking control. In this case, a proportional integral differential (PID) control is conducted for an error between the current position Fn of the focus lens 230 and the position F*n+1 of the focus lens 230 obtained from the zoom tracking curve based on the predicted position Z*n+1 of the zoom lens 210, so that tracking accuracy can be enhanced.

In the zoom tracking control to be performed with prediction of the zoom operation, 100 or more parameters are present in relation to zoom, a distance, a frame rate, and the like, and thus tuning itself is hard to perform. Further, the tuning is executed by a single lens to determine parameters and the parameters are applied to all of other lenses. For this reason, there is an influence of variations of each lens. Furthermore, it is hard to deal with various speeds of operating the zoom ring such as sudden stop of operation of the zoom ring. Therefore, the feedback control (PID control) is introduced as described above, and thus, it is also made possible to decrease burden of the tuning work, thereby alleviating the influence of variations and dealing with the various zoom ring operating speeds.

FIGS. 11A to 11F illustrate a prediction control error in each of the conventional zoom tracking control for performing zoom tracking in the same cycle as the cycle of the BL synchronizing signal and the zoom tracking control according to the present embodiment which performs the zoom tracking in a 1/n (n: an integer) cycle of the BL synchronizing signal.

FIG. 11A shows the BL synchronizing signal in the cycle T1 (e.g., 33.33 ms). FIG. 11B shows a change in the position of the zoom lens 210 along with the operation of the zoom ring 213 by a user. FIG. 11C shows a change in the position of the focus lens 230 in the conventional tracking control (control for performing zoom tracking in the same cycle as the BL synchronizing signal) in which the prediction control of the zoom lens position is not performed. FIG. 11D shows a change in the position of the focus lens 230 when the prediction control of the zoom lens position is not performed in the conventional tracking control. FIG. 11E shows a zoom tracking control signal according to the present embodiment in the cycle T2 (e.g., 4.167 ms). FIG. 11F shows a change in the position of the focus lens 230 when the prediction control of the zoom lens position is performed in the tracking control according to the present embodiment.

When the zoom tracking control is performed while the zoom lens position is predicted, the zoom lens position in a next cycle is predicted in a previous control cycle and the tracking position of the focus lens in the next control cycle is determined based on the predicted zoom lens position. Therefore, when the operation is stopped suddenly and immediately after the start of the zoom ring operation, a difference is made between the predicted position of the zoom lens and an actual zoom lens position, and thus the predicted tracking position has a deviation from a value to be actually generated, so that an accurate in-focus state cannot be obtained.

For example, in the conventional tracking control (see FIG. 11D), the zoom lens position after one cycle (T1) is predicted at a time t30, and the focus lens position after one cycle (T1) is determined based on the predicted zoom lens position. In this case, if the zoom ring operation is stopped at a time tx between the time t30 and a time t40, an error Δx is made in the focus lens position based on a predicted value. On the other hand, in the present embodiment, the zoom tracking control is performed in a shorter cycle (T2) than the cycle of the conventional tracking control (the cycle (T1) of the BL synchronizing signal). For this reason, a prediction amount per cycle can be reduced more greatly. Accordingly, an error Δy of the focus lens position with the stoppage of the zoom ring operation (see FIG. 11F) is smaller than a conventional error Δx.

In other words, in the present embodiment, the zoom tracking control is performed in a shorter cycle (e.g., 1/x cycle (x: integral multiplication)) than the cycle of the BL synchronizing signal. With this control, when the zoom tracking control is performed while the zoom lens position is predicted, the error of the prediction control can be reduced even if the zoom ring is suddenly and quickly turned or suddenly stopped. Consequently, the accurate zoom tracking can be performed and an in-focus state can be obtained very accurately.

In place of the prediction of the position of the zoom lens 210 by the lens controller 240, the detector 212 may predict the position of the zoom lens 210 to output the predicted position to the lens controller 240. Alternatively, the zoom ring 213 may output an electric signal indicative of an amount of turning operation. The lens controller 240 may predict the position of the zoom lens 210 based on the amount of turning operation of the zoom ring 213.

1-3. Effects, and the Like

As described above, the digital camera 1 (an example of an imaging apparatus) according to the present embodiment includes the interchangeable lens 200 and the camera body 100 to which the interchangeable lens 200 is mountable. The camera body 100 includes the CMOS image sensor 110 (an example of an imaging unit) that captures a subject image received via the interchangeable lens 200 at a predetermined frame rate to generate an image signal, and the body mount 150 (an example of a communicating unit) that transmits to the interchangeable lens 200 the BL synchronizing signal (an example of a synchronizing signal) having the same cycle as the cycle of the capturing operation in the CMOS image sensor 110.

The interchangeable lens 200 includes the focus lens 230, the zoom lens 210, the zoom ring 213 (an example of an operating unit) that receives user operation to the zoom lens, the drive mechanism 211 (an example of a zoom lens driver) that moves the zoom lens 210 in accordance with user operation for the zoom ring 213, the detector (an example of a position detector) 212 that detects the position of the zoom lens 210, the flash memory 242 (an example of a storage unit) that stores the zoom tracking information (an example of relation information) relating the position of the zoom lens 210 to the focus position of the focus lens 230, the focus motor 233 (an example of a focus lens driver) that drives the focus lens 230, the lens controller 240 that controls the focus motor 233, and the lens mount 250 (an example of the communicating unit) that receives the BL synchronizing signal from the camera body 100.

The lens controller 240 performs the zoom tracking control which determines the focus position of the focus lens 230 from the position of the zoom lens 210 detected by the detector 212 by referring to the zoom tracking information, and controls the focus motor 233 to move the focus lens 230 to the determined focus position. The lens controller 240 performs the zoom tracking control in a cycle (e.g., a 1/n cycle (n: an integer)) shorter than the cycle indicated by the BL synchronizing signal received via the lens mount 250.

In this way, the zoom tracking control is performed in the 1/n (n: an integer) cycle of the BL synchronizing signal. Consequently, as compared with the conventional zoom tracking control, the zoom tracking can be performed at a shorter interval. Hence, the accurate zoom tracking following the actual zoom lens position can be performed so that the in-focus state can be obtained with high accuracy. Especially for recording high definition (such as 4K) moving image, high quality moving image suppressing degradation of image quality can be obtained.

Other Embodiments

As described above, the first embodiment has been explained to be illustrative as the technique disclosed in the present application. However, the technique in the present disclosure is not restricted thereto but can also be applied to embodiments in which modifications, replacements, additions, omissions and the like are made properly. Moreover, it is also possible to make a new embodiment by combining the respective components described in the first embodiment. Therefore, other embodiments will be illustrated below.

Although the CMOS image sensor has been illustrated as the imaging unit in the embodiment, the imaging unit is not restricted thereto. The imaging unit may be an image sensor of another type. For example, a CCD image sensor or an NMOS image sensor may be used.

In the above embodiment, the zoom tracking control has been performed in the 1/n (n: an integer) cycle of the BL synchronizing signal. However, the cycle of the zoom tracking control does not need to be always the 1/n (n: an integer) cycle of the BL synchronizing signal but it is sufficient that the cycle is shorter than the cycle of the BL synchronizing signal. With this configuration, the zoom tracking can be performed at a shorter interval and accurate zoom tracking following the actual zoom lens position can be performed so that the in-focus state can be obtained very accurately.

Although the description has been made using the digital camera which can exchange a lens as an example of the imaging apparatus in the above embodiment, the imaging apparatus may be any digital camera having a body including a non-exchangeable lens, as far as it has a zoom function. In this case, in the imaging apparatus, it is sufficient that the zoom tracking control is performed in a shorter cycle than the imaging cycle of an image sensor such as the CMOS image sensor.

Although the digital camera has been described as an example of the imaging apparatus, the idea of the present disclosure can also be applied to other types of imaging apparatus. In other words, the idea of the present disclosure can be applied to an imaging apparatus including an interchangeable lens having a zoom function and a body for transmitting a synchronizing signal to the interchangeable lens.

Figure 12:
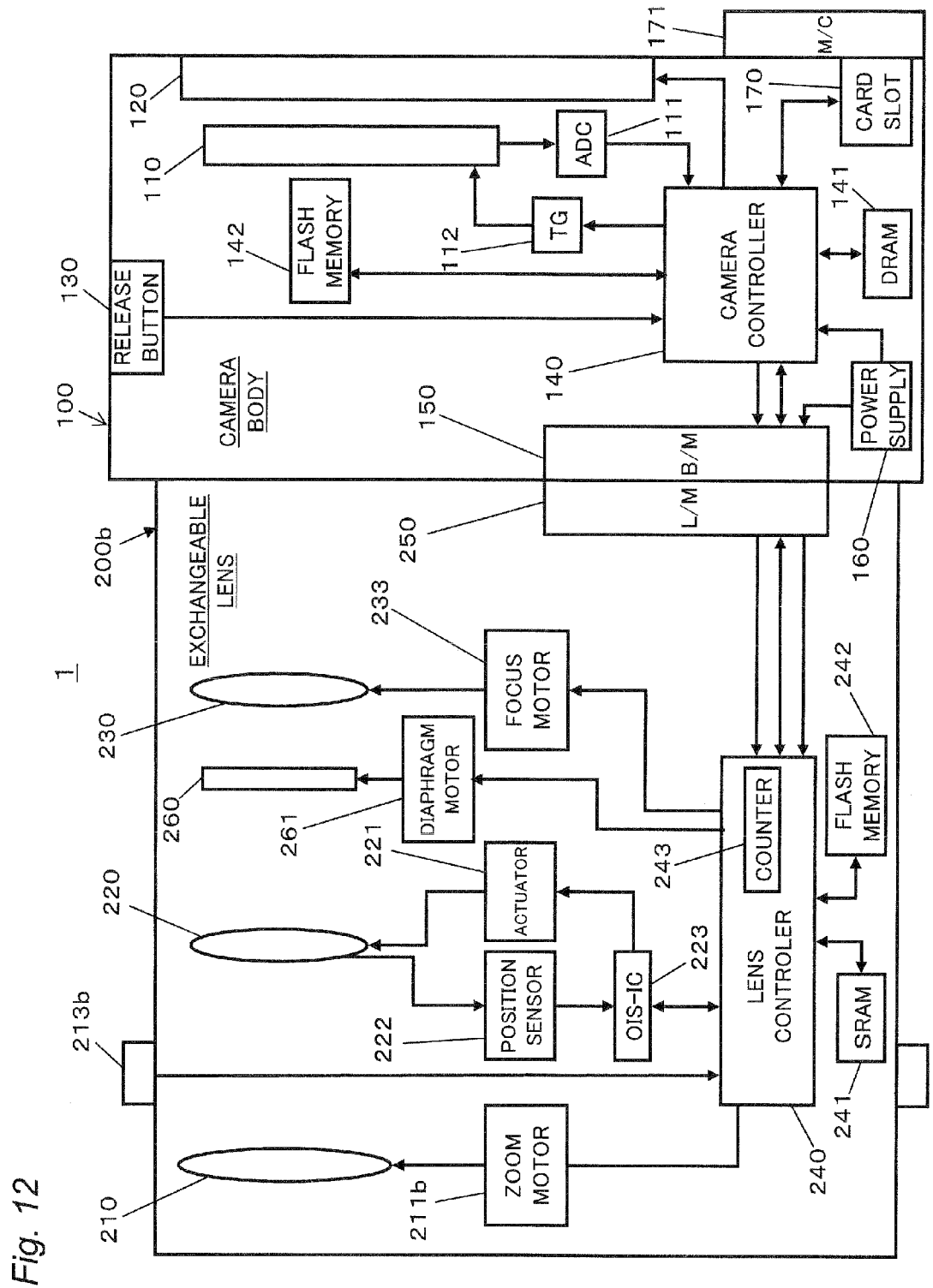
FIG. 12 illustrates a configuration of a digital camera including an exchangeable camera having an electromotive zoom function.

The control related to the zoom tracking disclosed in the above embodiment may also be applied to an imaging apparatus including an electric zoom. FIG. 12 shows a configuration of a digital camera including an exchangeable lens having an electric zoom. As shown in FIG. 12, the exchangeable lens 200b includes a zoom ring 231b for a user operation of electric zoom and a zoom motor 211b for driving the zoom lens 210.

The lens controller 240 detects an amount (turning amount, and turning speed) of operation for the zoom ring 213b, determines a target position for moving the zoom lens 210 based on the detection result, and drives the zoom motor 211b to move the zoom lens 210 to the target position.

In such a zoom operation with the electric zoom, the control, as described in the first embodiment, for performing zoom tracking in a cycle of 1/n (n: an integer) of a cycle of BL synchronizing signal can be applied. With the zoom tracking control in a cycle of 1/n (n: an integer) of a cycle of BL synchronizing signal, the zoom tracking can be performed at a shorter interval than the conventional zoom tracking control, even for an electric zoom. Thus, even for an electric zoom, high accurate zoom tracking which can follow an actual zoom lens position can be achieved, obtaining an in-focus state very accurately.

The camera body 100 may have a function of automatically controlling a zoom magnification to keep a size of a subject in a captured image constant for a specific subject. In this case, the camera body 100 detects the specific subject from the captured image, and automatically controls a zoom magnification, that is, a zoom lens position to keep a size of the specific subject in the captured image constant. As such automatic control of the zoom lens position may be applied with the zoom tracking control as described in the above embodiment.

That is, the lens controller 240 may perform the zoom tracking control as described in the above embodiment not only when the zoom lens 210 is moved based on manual operation of the user but also when the zoom lens 210 is moved automatically. Specifically, when moving the zoom lens 210, the lens controller 240 may perform a zoom tracking control to determine a focus position of the focus lens 230 from a position of the zoom lens 210 by referring to the zoom tracking information and move the focus lens 230 to the determined focus position. The lens controller 240 may perform the zoom tracking control in a cycle (for example, 1/n (n: integer)) shorter than a cycle indicated by the BL synchronization signal received through the lens mount 250.

As described above, the embodiment has been described to be illustrative as the technique in the present disclosure. For this purpose, the accompanying drawings and the detailed description have been provided.

Accordingly, the components described in the accompanying drawings and the detailed description may include indispensable components to solve the problem, and furthermore, components which are not indispensable to solve the problem in order to illustrate the technique. For this reason, non-indispensable components should not be approved to be indispensable immediately based on the fact that the non-indispensable components are described in the accompanying drawings or the detailed explanation.

Since the embodiment serves to illustrate the technique in the present disclosure, moreover, it is possible to make various changes, replacements, additions, omissions and the like within the claims or the range of equivalents.

The present disclosure is useful in an imaging apparatus (for example, digital camera, video camera, monitoring camera) having a zoom function because an in-focus state can be obtained very accurately in zoom tracking control.

What is claimed is:

1. An imaging apparatus including an exchangeable lens and a camera body to which the exchangeable lens is mountable, wherein
   the camera body comprises:
   an imaging unit that captures a subject image received via the interchangeable lens at a predetermined frame rate to generate an image signal; and
   a first communicating unit that transmits to the interchangeable lens a synchronizing signal having the same cycle as the cycle of the capturing operation in the imaging unit,
   the exchangeable lens comprises:
   a focus lens;
   a zoom lens;
   an operating unit that receives user operation to the zoom lens;
   a zoom lens driver that moves the zoom lens in accordance with user operation to the operating unit;

a position detector that detects a position of the zoom lens;

a storage unit that stores relation information relating a position of the zoom lens to a focus position of the focus lens;

a focus lens driver that drives the focus lens;

a controller that controls the focus lens driver; and a second communicating unit that receives the synchronizing signal from the camera body, the controller performs a zoom tracking control by determining the focus position of the focus lens from the position of the zoom lens detected by the position detector by referring to the relation information, and controlling the focus lens driver to move the focus lens to the determined focus position, and the controller performs the zoom tracking control in a cycle shorter than a cycle indicated by the synchronizing signal received via the second communicating unit of the exchangeable lens.

2. The imaging apparatus according to claim 1, wherein the zoom lens driver is a mechanism that moves the zoom lens along with user operation to the operation unit.

3. The imaging apparatus according to claim 1, the controller determines a predicted position which is a position of the zoom lens after one cycle of the capturing operation, from a current zoom position detected by the position detector, and performs the zoom tracking control based on the predicted position.

4. The imaging apparatus according to claim 3, wherein the controller performs proportinal integral differential (PID) control to an error between the current position of the focus lens and a position of the focus lens obtained based on the predicted position.

5. The imaging apparatus according to claim 3, wherein the predetermined frame rate is 24, 25, 30, 48, 50, 60, 100, 120, 200 or 240 frame/sec.

6. The imaging apparatus according to claim 1, wherein the controller performs the zoom tracking control in an n-th part of a cycle indicated by the synchronizing signal, where 'n' is a positive integer.

7. The imaging apparatus according to claim 6, wherein the controller performs the zoom tracking control in a cycle of tenth, eighth, or fourth part of a cycle indicated by the synchronizing signal.

8. An exchangeable lens mountable to a camera body including an imaging unit that captures a subject image at a predetermined frame rate to generate an image signal, the exchangeable lens comprising:

a focus lens;

a zoom lens;

an operating unit that receives user operation to the zoom lens;

a zoom lens driver that moves the zoom lens in accordance with user operation to the operating unit;

a position detector that detects a position of the zoom lens;

a storage unit that stores relation information relating a position of the zoom lens to a focus position of the focus lens;

a focus lens driver that drives the focus lens;

a controller that controls the focus lens driver; and a communicating unit that receives a synchronizing signal from the camera body, wherein the controller performs a zoom tracking control by determining the focus position of the focus lens from the position of the zoom lens detected by the position detector by referring to the relation information, and controlling the focus lens driver to move the focus lens to the determined focus position, and the controller performs the zoom tracking control in a cycle shorter than a cycle indicated by the synchronizing signal received via the communication unit of the exchangeable lens.

9. An imaging apparatus including an exchangeable lens and a camera body to which the exchangeable lens is mountable, wherein the camera body comprises:

an imaging unit that captures a subject image received via the interchangeable lens at a predetermined frame rate to generate an image signal; and a first communicating unit that transmits to the interchangeable lens a synchronizing signal having the same cycle as the cycle of the capturing operation in the imaging unit, the exchangeable lens comprises:

a focus lens;

a zoom lens;

a zoom lens driver that moves the zoom lens;

a storage unit that stores relation information relating a position of the zoom lens to a focus position of the focus lens;

a focus lens driver that drives the focus lens;

a controller that controls the focus lens driver; and a second communicating unit that receives the synchronizing signal from the camera body, the controller performs, when moving the zoom lens, a zoom tracking control by determining the focus position of the focus lens from the position of the zoom lens by referring to the relation information, and controlling the focus lens driver to move the focus lens to the determined focus position, and the controller performs the zoom tracking control in a cycle shorter than a cycle indicated by the synchronizing signal received via the second communication unit of the exchangeable lens.

* * * * *